United States Patent [19]

Ericsson

[11] 4,075,694
[45] Feb. 21, 1978

[54] APPARATUS IN CONNECTION WITH A COMPUTER MEMORY FOR ENABLING TRANSPORTATION OF AN EMPTY MEMORY FIELD FROM ONE SIDE TO THE OTHER OF AN ADJACENT DATA FIELD WHILE THE COMPUTER IS OPERATIVE

[75] Inventor: Ernst Enoch Ericsson, Alta, Sweden
[73] Assignee: Telefonaktiebolaget L M Ericsson, Stockholm, Sweden
[21] Appl. No.: 729,359
[22] Filed: Oct. 4, 1976
[30] Foreign Application Priority Data
 Oct. 23, 1975 Sweden ............................ 7511893
[51] Int. Cl.² ......................................... G06F 13/00
[52] U.S. Cl. ................................................ 364/200
[58] Field of Search ............... 364/200, 900, 200 MS, 364/900 MS

[56] References Cited
U.S. PATENT DOCUMENTS
3,228,005  1/1966  Delmege, Jr. et al. ............. 364/200
3,553,652  1/1971  Hanson .............................. 364/900

Primary Examiner—Harvey E. Springborn
Attorney, Agent, or Firm—Hane, Roberts, Spiecens & Cohen

[57] ABSTRACT

Apparatus is provided in connection with a computer memory for enabling a step by step transportation of an empty memory field containing a number of empty memory words from one side to the other of an adjacent data field containing a number of occupied memory words, while the computer is operative, by relocating the data field in such a manner that the information stored in each successive memory word adjacent to one border of the empty memory field is transferred to an empty memory word on the other border of the empty memory field, the latter field thus dividing the data field into two field portions which share said number of occupied memory words during the transportation. Incoming addresses, referring to a continuous area representing a data field being transferred, are converted so that the addresses instead refer to the two field portions. The continuous area is preferably identical with the relocated data field in one of its extreme positions, i.e. either the original position or the final position. By means of comparators the incoming addresses are compared with certain of the border addresses which delimit the field portions, thus determining whether or not the incoming address must be modified. When modification is to be made the address is incremented by an amount corresponding to the size of the empty memory field.

3 Claims, 5 Drawing Figures

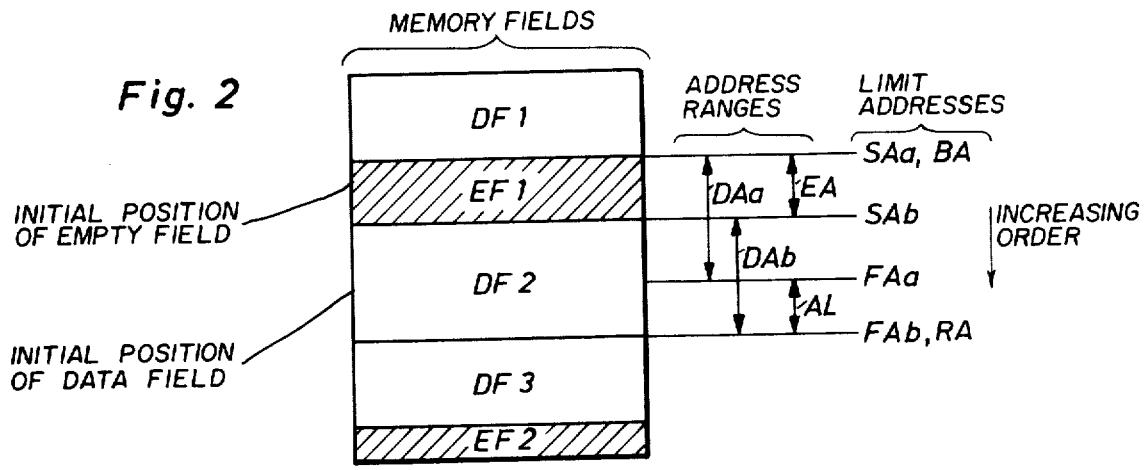
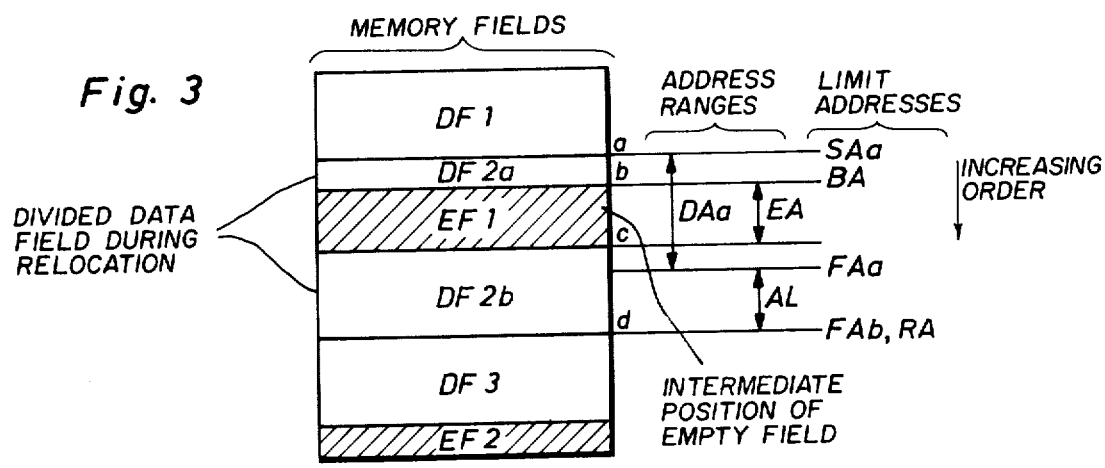
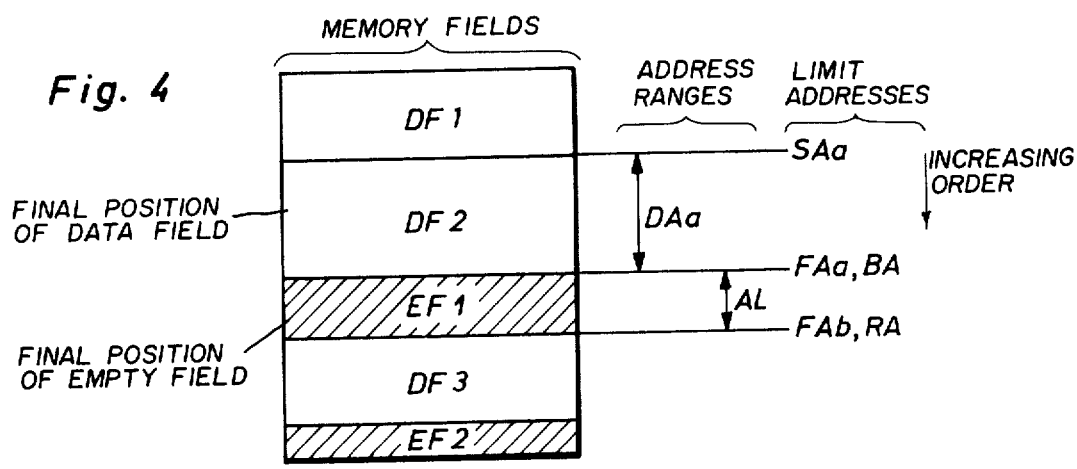

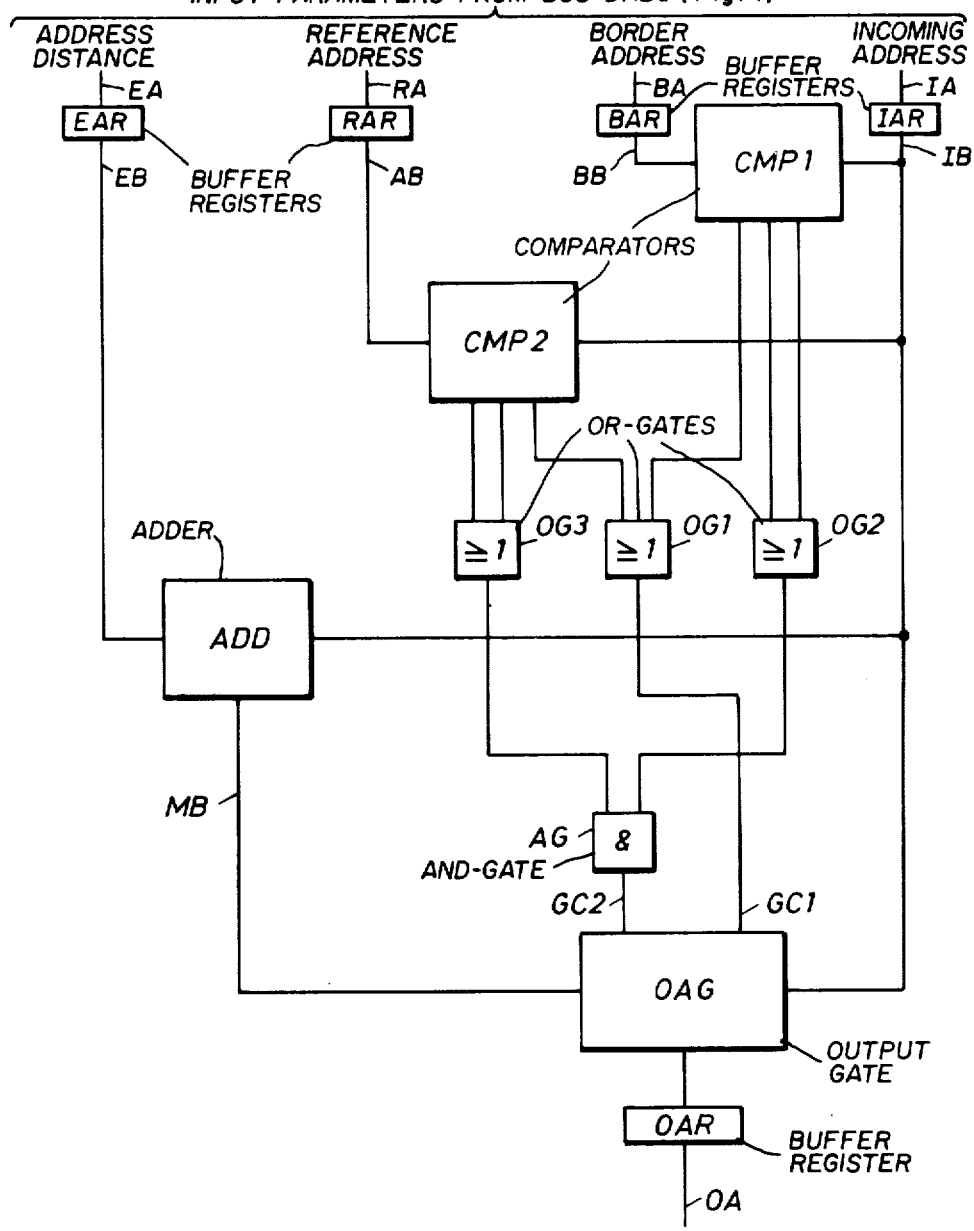
Fig. 5 OUTGOING ADDRESS TO BUS DABb (Fig. 1)

APPARATUS IN CONNECTION WITH A COMPUTER MEMORY FOR ENABLING TRANSPORTATION OF AN EMPTY MEMORY FIELD FROM ONE SIDE TO THE OTHER OF AN ADJACENT DATA FIELD WHILE THE COMPUTER IS OPERATIVE

This invention pertains to apparatus in connection with a computer memory for enabling a step by step transportation of an empty memory field containing a number of empty memory words from one side to the other of an adjacent data field containing a number of occupied memory words, while the computer is operative, by relocating the data field in such a manner that the information stored in each successive memory word adjacent to one border of the empty memory field is transferred to an empty memory word on the other border of the empty memory field, the latter field thus dividing the data field into two field portions which share such number of occupied memory words during the transportation.

In a computer controlled installation, e.g. a telephone station, programs and data are often segmented according to the various functions of the installation. During the lifetime of the installation the functions are subject to changes in respect to both size and type. As a consequence of these changes a need arises to make relocations in the data memories which means that the information is moved to new addresses. The relocation can be planned completely removed from the installation and then be carried out by writing new information into all memory positions. This method, however, leads to an undesirable interruption of the operation while the writing is in progress.

The Swedish Pat. No. 365,093 "Function block oriented SPC-system" discloses a method of performing relocations in an operative data memory by means of a special relocation program which works on a lower priority level than the job programs. Thus, the relocation procedure is often interrupted by job programs which may address the data field to be relocated. To avoid addressing problems the original data field is kept intact until the entire contents have been copied in the new data field, and not until then the addresses are changed. The described method implies that the data field can only be moved to a memory field which is at least as large as the original data field, as a consequence of which one cannot directly fill a smaller memory field which for some reason has become empty. In such a case one must first move the data field in question to another space in the memory which is available for this purpose, in order to create a larger empty field consisting of both the original empty memory field and the original data field before its being moved. The condition is thus that the memory contains an area which can be used for the relocation. If this is not the case the relocation cannot be executed.

An object of the present invention is to enable relocation of an operative data field without the described limitations with respect to the size of the empty memory field. The purpose of the relocation may be the filling of an empty memory field as described above or the contrary, i.e. to create an empty field next to a data field, to enable the extension of that one. The relocation proper is executed at a low priority level and it is performed by virtually moving the empty memory field through an adjacent data field. The information in each successive memory word of the data field in question is then moved from one side of the empty memory field to the other, one at a time, the empty field thus dividing the data field into two field portions as long as the relocation continues. This type of relocation entails the problem of being able to address the memory words in the memory field in question at any time, in correspondence to the job program instructions, independent of in which field portion they are located at that moment. According to the invention the problem is solved by means of a translation unit, including comparators, by means of which the incoming addresses are modified in dependence of how far the rearrangement has progressed.

The characteristics of the invention appear from the claims.

In the following description of the invention reference is made to the accompanying drawings having five figures, where:

FIGS. 2–4 show, schematically, a data memory in three phases of the relocation procedure; and FIG. 5 is a schematic diagram showing an example of how the translation unit can be implemented.

Figure 1:
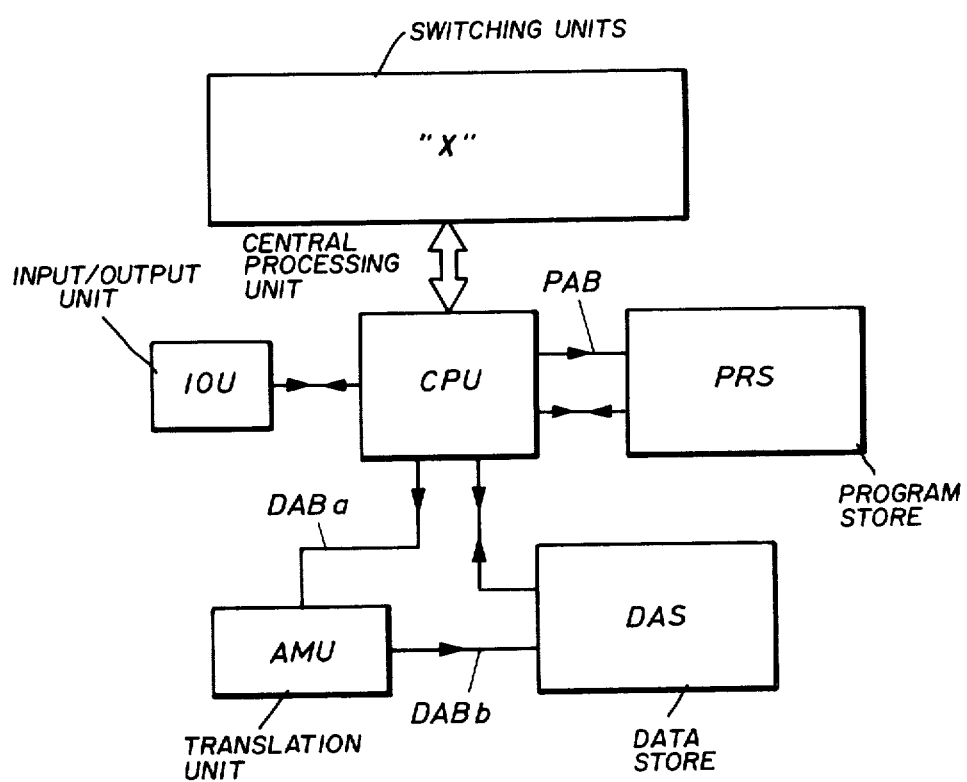
FIG. 1 is a block schematic for a computer installation comprising a translation unit in accordance with the invention.

The system shown in FIG. 1 comprises a central processing unit CPU including an input/output unit IOU, a program memory PRS, a data memory DAS with a translation unit AMU and a block "X" which is connected to the central processing unit and contains e.g. switching units included in a telephone station controlled by the computer in real time. The switching units are scanned cyclically in accordance with a control program in the program memory during which data concerning the various units are stored in allocated data fields in the data memory. Due to changes within the block "X" or modified working of the system, corresponding changes have to be made in the data memory. The changes are made in accordance with instructions which are introduced via the input/output unit IOU and are executed by means of a special rearrangement program at a low priority which program is repeatedly interrupted by programs having a higher priority. The addressing problems which are associated with this relocation procedure are described in U.S. Pat. No. 3,967,248. As a consequence of the above mentioned changes in the data memory, empty memory fields of various sizes are developed in various places. It is desirable to join these empty fields into one continuous field preferably at the end of the memory. This joining is executed in the manner mentioned earlier, i.e. an empty memory field is moved effectively through an adjacent data field by means of another relocation program which also works on a low priority level. If, during the relocation procedure, a program of a higher priority level addresses a data field in the process of being moved, address modification may be necessary, depending upon whether the address memory word has already been moved or not. This modification is performed by the translation unit AMU which is incorporated in the address bus DAB$a$-DAB$b$ between the central processing unit CPU and the data memory DAS. A similar unit can also be incorporated in the address bus PAB between the central processing unit CPU and the program memory PRS.

The memory shown in FIG. 2 comprises three data fields, DF1, DF2, DF3, and two empty memory fields EF1, EF2. It is assumed that there is a request to join the field EF1 with the field EF2 by moving the first one downwards, as viewed in FIG. 2 through the data fields DF2 and DF3. FIG. 3 shows the situation in the same memory after the transfer has been started and as can be seen the empty memory field EF1 divides the original data field DF2 into two field portions DF2a, DF2b. According to FIG. 4 the transfer has progressed so far that the data field DF2 has once again become one entity and takes its new position in the memory between the data field DF1 and the empty memory field EF1. In a corresponding manner the field EF1 is then moved through the data field DF3, the result being a continuous empty memory field formed by the fields EF1 and EF2.

As a matter of course, the addresses pertaining to the data field DF2 which are sent out from the central processing unit CPU to the translation unit AMU via the address bus DABa prior to the relocation relate to the condition described by FIG. 2, but after the relocation has been completed they should refer to the condition described by FIG. 4. In principle, the addresses can be changed at any time before, during or after the relocation but, for practical reasons, the addresses should in any case refer to a continuous area. In the following assume that the addresses are changed prior to the relocation so that the addresses on the address bus DABa to the translation unit AMU refer to an area corresponding to the final position of the data field DF2 shown in FIG. 4 already from the beginning, as a consequence of which, prior to the relocation, the addresses on the address bus DABb from unit AMU to the data memory DAS must be modified by an address difference corresponding to the size of the empty memory field EF1. During the relocation, modification shall be made only for those memory words which have not yet been moved, i.e. the addresses to the field portion DF2b, the addresses to the field portion DF2a being forwarded without modification. In FIGS. 2–4 the actual address ranges are indicated by arrows. Thus the addresses arriving on the address bus DABa, corresponding to the final position of the data field DF2 in accordance with FIG. 4, have been given the range designation DAa. DAb is the range of addresses which shall be delivered on the data bus DABb when the data field is in its original position according to FIG. 2 which range, according to the figure, is separated from the range DAa by the address distance EA which is equal to the number of addresses in the empty memory field EF1. The indicated address ranges are delimited by definite memory addresses, i.e. addresses which arrive at the memory DAS on the address bus DABb, the most important of which have been given designations in accordance with FIGS. 2–4. SAa and FAa designate the addresses to the first and the last memory words in the range DAa, i.e. the limit addresses of the data field DF2 in its final position according to FIG. 4. SAb and FAb are the corresponding limit addresses for the original position according to FIG. 2. BA designates the address of the first memory word in the empty memory field EF1 which in FIG. 2 coincides with the limit address SAa and in FIG. 4 with FAa, whereas according to FIG. 3 it ajoins to the field portion DF2a all the time during the relocation procedure. Consequently, the field portion DF2a comprises the address range from SAa to BA-1. According to the preceding, modification is to be executed for addresses pertaining to the field portion DF2b which arrive at the translation unit AMU in the address range BA-FAa. The modification consists in the addition of the address distance EA to the arriving addresses. It should be noted that no arriving addresses exist in the range FAa+1 to FAb, designated by AL, and therefore the modification can be extended to the range from BA up to FAb without changing the result. In the following it is assumed that the limit address FAb is used as the reference address RA for the modification.

FIG. 5 shows an example of how the translation unit AMU can be implemented. The unit includes two comparators CMP1, CMP2 for comparison of incoming addresses with each one limit address. Incoming addresses arrive at the unit on an input IA and are stored in a register IAR. From there they are distributed on a bus IB to the two comparators, an adder ADD and a gate device OAG. The one limit address is the address BA mentioned before and it is received on the input labelled BA and stored in a register BAR. From there it is fed to the comparator CMP1 via the bus BB. The other limit address is the reference address FAb mentioned above which is received on the input RA and stored in a register RAR. From there it is fed to the comparator CMP2 via the bus AB. Each comparator has three outputs. The left hand output as shown in FIG. 5 supplies an indication when the address on the left hand input is greater than the address on the right hand input, on the right hand output an indication is received when the relation is reversed and on the center output an indication is received when the two addresses are equal. On one of its inputs the adder ADD receives incoming addresses and on the other input the address distance EA via a bus EB. The address distance information was received on the input EA and had been stored in a register EAR. A sum of the two addresses is supplied on an output from the adder ADD to the gate device OAG via a bus MB. The gate device has two control inputs GC1, GC2 corresponding to each one of the bus inputs IB, MB and an output to a register OAR for the supply of outgoing addresses to the output OA. Control signals to the inputs GC1, GC2 are generated by a number of logic circuits comprising three OR-circuits OG1, OG2, OG3 and an AND-circuit AG in correspondence with the indications from the comparators CMP1, CMP2. In order to avoid ambiguity, it may be appropiate to point out that the block schematic of FIG. 1 is extremely simplified, its only purpose being to show how the translation unit AMU is incorporated in the address bus between the central processing unit CPU and the data memory DAS. For comparison it should be noted that the input DABa of FIG. 1 is related to the input IA of FIG. 5, whereas the output DABb corresponds to the output OA. In the same manner as the input IA, the inputs BA, AL, EA are connected to the central processing unit CPU.

In connection with a data field relocation being started, modification conditions are received on the three inputs BA, RA, EA to be stored in registers BAR, RAR, EAR. Thus, to start with, the limit address SAa is stored in BAR and in accordance with the previous assumption the limit or reference address FAb or RA is stored in register RAR and the address distance EA is stored in register EAR. The latter two pieces of information are kept unchanged during the whole relocation procedure but the contents of the register BAR are continually updated while the relocation continues. When the relocation of the data field DF2 is completed the register BAR will contain the address FAb+1.

In the comparator CMP1 each incoming address IA is compared with the address BA and in the comparator CMP2 with the address FA*b* or RA. If the comparison shows that IA is less than BA, this is indicated on the left hand output from CMP1 which is connected to one of the inputs of the OR-circuit OG1. The output of the OR-circuit is connected to the control input GC1 of the gate device OAG which in consequence of the received indication signal through-connects the incoming address which is available on the bus IB to the register OAR. In the other extreme case the incoming address IA is greater than FA*b* RA and instead an indication is obtained on the right hand output from CMP2 which is connected to the other input of the OR-circuit OG1. Consequently the gate device OAG will through-connect the incoming address IA to the register OAR also in this case and from there it will be available on the output OA. Incoming addresses which are greater than or equal to the limit address BA give rise to indication signals on the right hand output or the center output, respectively, from the comparator CMP1 which are connected to the two inputs of the OR-circuit OG2. If, at the same time, the incoming address is less than or equal to the reference address RA an indication is obtained also on the left hand output or the center output from the comparator CMP2 which are connected to each one input of the OR-circuit OG3. The outputs of the two OR-circuits forward the indications to the two inputs of the AND-gate AG, the output of which is connected to the control input GC2 of the gate device OAG. In this case the gate device will through-connect the result address which is available on the bus MB from the adder ADD, i.e. the incoming address IA incremented by the address distance EA.

I claim:

1. In apparatus for use in a computer system having an addressable computer memory for enabling a step by step transportation of an empty memory field containing a number of empty memory words from one side to the other of an adjacent data field containing a number of occupied memory words, while the computer is operative, by relocating the data field in such a manner that the information stored in each successive memory word adjacent to one border of the empty memory field is transferred to an empty memory word on the other border of the empty memory field, the latter field thus dividing the data field into two field portions which share said number of occupied memory words during the transportation, an address modification unit for modifying of incoming addresses concerning a data field in the process of being relocated in order for the addresses to become related to said two field portions, each having two limit addresses, whereas having been related to one continuous area with two limit addresses, said continuous area being chosen such that one of said field portions is enclosed by the continuous area and shares one of its limit addresses with the latter area, said modification unit comprising comparator means for comparing said incoming addresses with that address in said empty memory field which adjoins to said one of said field portions and with a reference address which, in order to include all incoming addresses to be modified but exclude addresses relating to memory field not being concerned with said relocation, is allocated any chosen address in the address range starting with the other limit address of said continuous area and including the extreme border of the other of said field portions, and logic circuits responsive to output signals from said comparators for incrementing the incoming address by an address distance corresponding to said number of empty memory words when said output signals indicate that said incoming address falls within a range delimited by and including on the one hand said address in said empty memory field which adjoins said one of said field portions and on the other hand said reference address.

2. In a computer system having a memory with a plurality of consecutively addressed memory locations divided up into three fields, a first field comprising memory locations having addresses $a$ to $b$, a second field comprising memory locations having addresses $b + 1$ to $c$, and a third field comprising memory locations having addresses $c + 1$ to $d$, wherein $d > c > b > a$, and $c - b = r$, and address generating means for emitting addresses in the range from $a$ to $q$, where $q > d$, address modification apparatus for processing addresses received in the range of from $a$ to $p$ to addresses in the range from $a$ to $b$ and from $c + 1$ to $d$ for transfer to the memory where $p = b + d - c$, said apparatus comprising a first register means for storing the value $r$, second register means for storing the address $d$, third register means for storing the address $b + 1$, fourth register means for storing the address emitted by the address generating means, first comparator means for magnitude comparing the contents of said third and fourth registers, second comparator means for magnitude comparing the contents of said second and fourth registers, adder means for adding the contents of said first and fourth registers, and logic means responsive to said first and second comparator means for transmitting the address stored in said fourth register to the memory when the address stored in said fourth register is less than the address stored in said third register or greater than the address stored in said third register and for all other cases transferring to the memory the sum formed by said adder means.

3. The system of claim 2 further comprising means for unit incrementing the address to be stored is said third register.

* * * * *